G. W. BROWN.
Corn-Planters.

No. 152,967.  Patented July 14, 1874.

Witnesses:
M. H. Barringer.
J. J. Tunnicliff

Inventor:
George W. Brown,
by W. B. Richards.

UNITED STATES PATENT OFFICE.

GEORGE W. BROWN, OF GALESBURG, ILLINOIS.

IMPROVEMENT IN CORN-PLANTERS.

Specification forming part of Letters Patent No. 152,967, dated July 14, 1874; application filed February 7, 1874.

CASE B.

*To all whom it may concern:*

Be it known that I, GEORGE W. BROWN, of Galesburg, county of Knox and State of Illinois, have invented certain new and useful Improvements in Corn-Planters, of which the following is a specification:

The present invention relates to improvements in that class of machines for planting corn in which a rotary seed-cup disk, with other devices, is arranged within a seed-box or hopper, and operated by suitable propelling apparatus, for measuring the seed desired for each separate hill, and separating the same from the mass of seed in said hopper; and the invention consists in improvements in the cap which acts as a retainer for the operating devices of the seed-measuring part of the dropper, and the adjacent parts of the motive apparatus for operating the same, and as a supporting-frame for the yielding cut-off, and the yielding strikes or arms for insuring a regular quantity of seed in each cup before its passage beneath the cut-off, all as hereinafter fully described.

To enable those skilled in the art to understand and use my invention, I will now proceed to describe the manner in which the same is or may be carried into effect, by reference to the accompanying drawing, in which—

Figure 5:
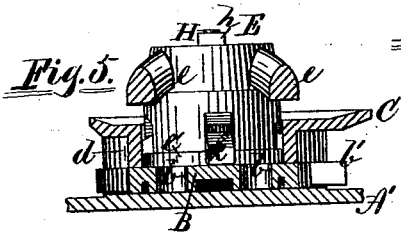
Figure 6:
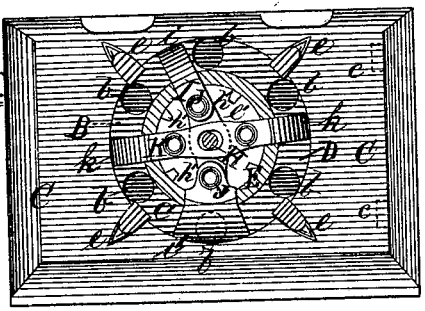
Figure 2:
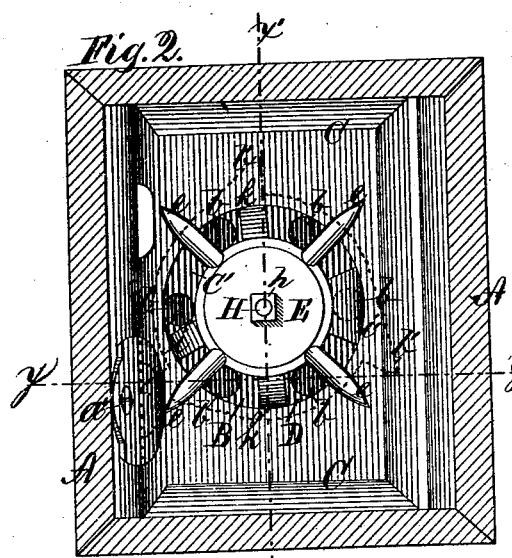
Figure 3:
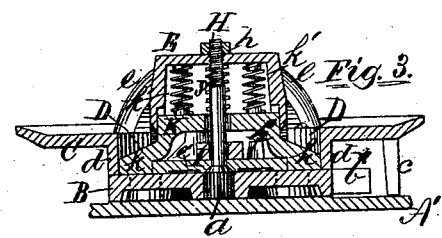
Figure 4:
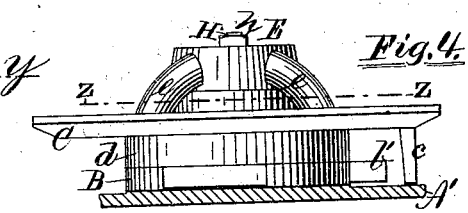
Figure 1:
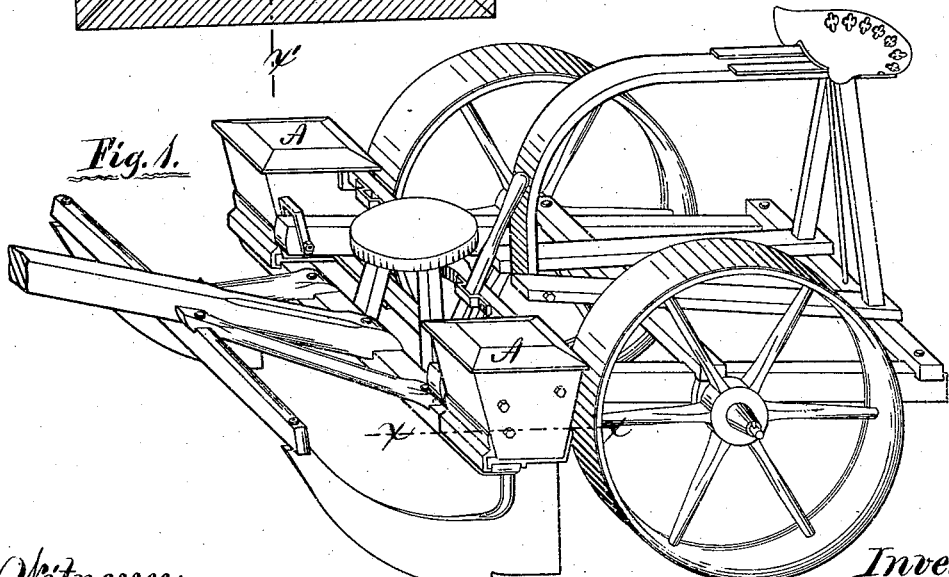

Figure 1 is a perspective view of a machine embodying my invention. Fig. 2 is a horizontal sectional view of the left-hand seed-box, on the plane of the line $x\ x$ of Fig. 1. Fig. 3 is a vertical section of the seed-cup disk and adjacent parts, on the plane of the line $x'\ x'$ in Fig. 2. Fig. 4 is a side elevation of the parts sectioned in Fig. 3. Fig. 5 is a section of the same parts, on the vertical plane of the line $y\ y$ in Fig. 1; and Fig. 6 is a horizontal sectional view of the same parts, on the line $z\ z$ in Fig. 4.

The similar letters used as marks of reference apply to the like parts in all of the figures.

A A in the drawings represent the hoppers or seed-boxes, located somewhat differently upon different machines, one plan of which is plainly shown by the perspective view, Fig. 1, upon a reduced scale. The details of construction of the seed-box, seed-tube below it, and other parts of the machine shown in the exterior view at Fig. 1, are not material, said drawing itself sufficiently illustrating them. B is the rotary seed-cup disk, pivoted centrally upon a stud, $a$, projecting upward from the bottom A′ of the hopper in the usual manner, and pierced with a series of holes, $b$, equidistant from its center, which form the seed measures or cups, and is provided with spiral flanges $b'$ upon its circumference, through which it receives the successive impulses from the motive apparatus to give it the necessary intermittent rotary motion. Resting upon supports, hereinafter described, is a plate, C, fitting the adjacent sides of the hopper A, and secured therein by having one of its sides rest beneath a ledge on the adjacent side of the hopper, and its other side locked by a cam-shaped button, $a'$. D is a circular opening through the cap C, from the edge of which an annular flange, $d$, projects downward to close proximity with the upper surface of the disk B, and its inner circumference concentric with the circle formed by the series of cups $b$, each of which is interior thereto. E is a cylindrical cap or chamber, supported centrally within the opening D by arms $e\ e\ e\ e$, its exterior circumference equal to the circle formed by the interior edges of the series of cups $b$, which are exterior thereto. $e'$ is a removable bottom plate for the chamber E, and is secured in place vertically by a bolt, H, and nut $h$, and laterally by lugs $h'\ h'\ h'$. I is a bar resting transversely on the bottom plate $e'$, its central part pierced with an elongated hole for the passage of the bolt H, and its ends $i\ i'$ extending outward through openings in the casing E, one of which is enlarged to form the cut-off $i'$. This arm or bar I fits snugly the recesses through which it passes in the casing E, which secures it from lateral displacement, and has central elevation within said casing, which secures it from longitudinal displacement. J J are spiral springs, from the bar I to the top of the casing E, held in place by lugs in the obvious manner. K is a bar, arched where it crosses the bar I, and is similar thereto, except that both of its extending ends $k\ k$ are formed narrow, same as the strike $i$, and it is also provided with spiral springs $k'$ $k'$, same as the bar I. The aforesaid arrangement of the casing E and the opening in the plate C, in which it is supported, it will be seen, leaves an annular opening, $C'$, through which the seed in the box A has free passage to the seed-cup disk B in the path or orbit of the seed-cups $b$ around their axis of revolution. The arms or strikes $k$ $k$ $i$ and cut-off $i'$ are made yielding by the spiral springs J $k'$, and the elongated hole through which the bolt H passes will allow either end to rise slightly independently, to prevent damage to grains projecting from the cups $b$. The bars I and K have shoulders, as shown in the drawings, which rest upon the bottom plate $e'$, and prevent friction from their resting upon the rotating disk B. The weight of the cap or plate C and the herein-described parts which it supports rests upon lugs $c$ $c$, and the head or lower end of the bolt H resting upon the upper end of the axial stud $a$, thus leaving the seed-cup disk B and the adjacent parts of the motive apparatus for propelling it free to act, almost frictionless. The arms or levelers $k$, $k$, and $i$ will smooth and regulate the grains of seed within the seed-cups as they pass successively beneath them, and thus serve to secure great uniformity in the number of seeds carried below the yielding cut-off $i'$, where they are discharged to the throat of the seed-tube in the well-known and obvious manner.

Having now described the manner in which my invention may be carried into effect, what I desire to secure by Letters Patent is—

1. The arm I, having the leveler $i$ and cut-off $i'$, seated within the case E, and arranged to operate with the rotary seed-cup disk B, substantially as and for the purpose specified.

2. The arm I, having leveler $i$ and cut-off $i'$, and the arm K, having the arms $k$ $k$, both seated within the case E, and arranged to operate with the rotary seed-cup bar B, substantially as and for the purpose specified.

3. The casing or chamber E, constructed as described, and centrally supported within the opening D in the plate C by arms, and carrying the yielding arms I and K, substantially as described, and for the purpose specified.

GEO. W. BROWN.

Witnesses:
 I. S. PERKINS,
 J. J. TUNNICLIFF.